(12) United States Patent
Williamson

(10) Patent No.: US 11,747,359 B2
(45) Date of Patent: Sep. 5, 2023

(54) HUMIDITY MEASUREMENT

(71) Applicant: Cambridge Sensor Innovation Limited, Harlton (GB)

(72) Inventor: Mark Edward Williamson, Harlton (GB)

(73) Assignee: CAMBRIDGE SENSOR INNOVATION LIMITED

( * ) Notice: Subject to any disclaimer, the term of this patent is extended or adjusted under 35 U.S.C. 154(b) by 288 days.

(21) Appl. No.: 17/075,783

(22) Filed: Oct. 21, 2020

(65) Prior Publication Data
US 2021/0123938 A1 Apr. 29, 2021

(30) Foreign Application Priority Data
Oct. 28, 2019 (GB) ...................................... 1915605

(51) Int. Cl.
*G01P 3/487* (2006.01)
*F24C 15/00* (2006.01)
*G01K 13/00* (2021.01)
*G01P 3/36* (2006.01)

(52) U.S. Cl.
CPC ............ *G01P 3/487* (2013.01); *F24C 15/003* (2013.01); *G01K 13/00* (2013.01); *G01P 3/36* (2013.01)

(58) Field of Classification Search
CPC . G01P 3/487; G01P 3/36; G01K 13/00; F24C 15/003
USPC .......................................................... 73/1.06
See application file for complete search history.

(56) References Cited

U.S. PATENT DOCUMENTS

| 5,694,835 | A | 12/1997 | Mangina |
| 6,193,384 | B1 | 2/2001 | Stein |
| 6,329,732 | B1 | 12/2001 | Straley |
| 6,662,628 | B2 | 12/2003 | Horvath et al. |
| 6,938,549 | B2 | 9/2005 | Gruhbaum et al. |
| 9,188,521 | B2 * | 11/2015 | Franzolin ................. G01N 9/36 |
| 9,496,817 | B1 * | 11/2016 | Lepka ...................... H02P 29/67 |
| 2003/0000284 | A1 * | 1/2003 | Horvath ................. G05D 22/02 73/29.01 |
| 2003/0167823 | A1 * | 9/2003 | Gruhbaum ............... A21B 3/04 73/24.04 |
| 2013/0136153 | A1 | 5/2013 | Lesmeister et al. |
| 2017/0363096 | A1 | 12/2017 | Fleming et al. |

FOREIGN PATENT DOCUMENTS

| DE | 4206845 | 10/1997 | |
| EP | 2088370 A1 * | 8/2009 | ............... A21B 3/04 |
| GB | 1178433 | 1/1970 | |
| GB | 2567076 | 12/2019 | |

OTHER PUBLICATIONS

Extended European Search Report issued on EP20198352.5, dated Feb. 25, 2021.

* cited by examiner

*Primary Examiner* — Nathaniel T Woodward
(74) *Attorney, Agent, or Firm* — Bell & Manning, LLC

(57) ABSTRACT

An apparatus such as a domestic oven incorporates an induction motor which drives a fan. The temperature of the circulating gas and the slip of the rotor, coupled to the fan, are used to determine the humidity of gas within the oven. The temperature of the stator coil is also taken into account. The fan is driven with relatively high torque to maximize the signal to noise ratio. The fan may be provided as the main fan or as a secondary fan dedicated to humidity measurement. In either case the fan has a long operational lifetime.

19 Claims, 15 Drawing Sheets

HUMIDITY MEASUREMENT

CROSS-REFERENCE TO RELATED APPLICATIONS

The present application claims priority under the Paris Convention to United Kingdom Patent Application 1915605.8, filed Oct. 28, 2019, the entire contents of which are hereby incorporated by reference.

FIELD OF THE INVENTION

The invention relates to the field of measuring humidity. The invention is explained with reference to the application of measuring humidity in a domestic oven, but it is also applicable to the measurement of humidity in other appliances, for example drying machines.

BACKGROUND

The effect of humidity during cooking on food quality, and on the effectiveness of the heat transfer processes occurring in an oven, is well known in the art. It is therefore desirable to accurately measure and control humidity within an oven, in order to optimize the quality and consistency of the food.

Domestic ovens cannot practically include sensors which require replacement or recalibration during their lifetime, which can typically be 12-15 years for a domestic oven. Furthermore, ovens are very hostile environments for sensors, with high temperatures (up to 450° C. in a pyrolytic oven), and volatile organic compounds (VOCs) including oils and fats which may be present in the vapor phase. These VOCs would foul a sensing surface very quickly and likely cause substantial errors and/or sensor failure. Accordingly, the invention seeks to provide a humidity sensor with a relatively long life despite the environment of an oven.

Still further, domestic appliances are typically mass-produced, meaning that any sensor systems must be very low cost. Another relevant factor is that ovens are used at a wide range of altitudes above sea level (0-3000 m) and this should not affect the sensing system. Embodiments of the present invention therefore seek to make humidity sensors cost effectively and these should ideally be insensitive to altitude.

It is known to determine humidity from the slip in an induction motor coupled to a fan, taking into account measurements of gas temperature and pressure. Although this principle has potential, it has not found commercial success because the signal to noise ratio is poor and due to other effects, which were not fully appreciated.

SUMMARY

According to a first aspect of the invention there is provided an apparatus comprising a fan, an induction motor having a stator and a rotor, the rotor coupled to the fan, an electrical circuit configured to apply an AC current to a coil of the stator, a temperature sensor configured to determine the temperature of gas within the apparatus, a speed sensor configured to determine the speed of rotation of the fan, and a processing circuit configured to process the determined temperature of the gas, and the speed of rotation of the rotor, to thereby determine a measurement of the humidity of gas within the apparatus.

The apparatus is typically an appliance, e.g. an oven or a drying machine (tumble dryer).

Typically, the circuit is configured to process the speed of rotation of the rotor to determine the slip, being the difference between the speed of rotation of the rotor and the synchronous speed of rotation of the rotor, and to use the slip to determine the humidity of the gas. The rotor is coupled to the fan and so the slip depends on the torque on the fan. Typically, the speed of rotation of the rotor is the same as the speed of rotation of the fan, where they are fixedly connected, and so the speed of rotation of the fan is the speed of rotation of the rotor, however the inclusion of some gearing mechanism between the rotor and the fan is not excluded. The speed of rotation of the rotor is typically determined by measuring the speed of rotation of the fan.

The synchronous speed of rotation of the rotor is the speed at which the magnetic field of the stator rotates, due to the AC current. In the case of an AC induction motor having P poles, expressed in RPM, the synchronous speed is given by:

$$N_s = \frac{120f}{P}$$

Typically, the induction motor has 2 poles, but this is not essential. The actual rotational speed, N, is always $<N_s$ due to slip, s:

$$s = \frac{N_s - N}{N_s}$$

with $0 \leq s < 1$.

The slip is indicative of the load torque of the rotor which is related to the humidity of the gas. Thus, determination of this parameter, slip, enables the humidity of the gas to be calculated.

It may be that the induction motor is a shaded pole motor. In this case, it has been determined experimentally that the slip, s, varies with torque and that the relationship is close to linear. It is also known that:

torque=[(N, $\rho$, bearing friction) with the density, $\rho$, given by the ideal gas law:

$$\rho = \frac{MP_{atm}}{RT}$$

where M is related to the density of steam. For a mixture of H vol % steam in air, this is given by:

$$M = \frac{(18H + 29(1 - H))}{100}$$

with R=8314 J/mol·K and T is the gas temperature in degrees Kelvin.

Accordingly, the humidity of the gas passing the fan can be determined from the slip provided that the gas temperature is also known. The temperature of the gas within the appliance is preferably the gas temperature at the fan. However, it is possible to measure the gas temperature elsewhere in the appliance (for example in the heating chamber) and to use that to infer the temperature of gas at the fan.

It may be that the apparatus is configured to determine the temperature of at least one coil of the stator. The apparatus may comprise a temperature sensor configured to measure the temperature of at least one coil of the stator. The apparatus may comprise a circuit which determines the temperature of at least one coil of the stator from the electrical properties of the at least one coil (e.g. resistance or reactance). This may be integrated into the circuit which applies the AC current. The method may comprise determining (e.g. measuring) the temperature of at least one coil of the stator.

The processing circuit may determine the measurement of humidity taking into account the determined temperature of the at least one coil of the stator.

We have found that the temperature of the stator can vary substantially and can have a significant effect on the relationship between speed and humidity with gas temperature. In some embodiments, the magnitude of the rate of change of slip with rotor temperature is greater than the magnitude of the rate of change of slip with gas temperature. Accordingly, by determining this temperature (which is an entirely separate determination to the temperature of the gas in the apparatus) a more accurate humidity measurement can be obtained.

Measurement of the temperature of the stator coil also enables the fan to be allowed to run at a higher torque, at which the signal to noise ratio (variation in slip with humidity) is greater.

The speed of rotation of the fan may be determined by a fan speed sensor. The fan speed sensor may comprise a Hall effect sensor or optical sensor which is fixed to the body of the appliance and a magnet or visible mark which rotates with the fan (e.g. on a thrower associated with the fan). The sensor generates a digital (pulse train) output which is not susceptible to analogue drift. This approach is low cost with no contact parts and so has a long lifetime.

The determination of the measurement of humidity may take into account a calibration factor related to the elevation above sea level, resistance of the bearings of the rotor and/or fan (which may change over extended time periods), and the mains supply voltage (typically corresponding to the voltage supplied to the coil). The calibration factor may be determined at first installation of the oven and/or periodically, by an automatic procedure (typically under the control of the controller).

The apparatus may be configured to switch off one or more heating elements of the appliance when a humidity measurement is being made. We have found that these can have a significant effect on the main supply voltage (due to their electrical load) which can effect humidity measurement.

It may be that the apparatus is configured so that slip varies by at least 0.001, or by at least 0.002, or at least 0.005, at least 0.01, or at least 0.15 between humidity of 0% and 100%, at constant gas and stator coil temperature. This arises when the apparatus is configured so that the torque which the fan must exert is sufficiently high. (In a prototype, slip varies by 0.017 between humidity of 0% and 100%.)

The apparatus may be configured to determine the variation in slip with humidity by configuring of the fan. For example, one or more orifices may be provided in the gas flow circulation pathway, through which circulating gas passes, impelled by the fan. The shape and size of the orifices can be selected to provide the required flow resistance.

The apparatus may have a heating chamber, for example the apparatus may be an oven and the heating chamber may be an oven chamber. The apparatus may be a drying machine (e.g. a tumble drier) and the heating chamber may be a drying chamber. The gas flow circulation pathway may extend from the heating chamber, through a gas conduit, past the fan, and back to the heating chamber.

The heating chamber may comprise one or more nozzles which direct gas which has been impelled by the fan, for example, nozzles in the roof of an oven chamber, which direct gas which has been impelled by the fan to impinge on food within the oven. The one or more nozzles may present significant flow resistance within the gas flow circulation pathway.

It may be that the apparatus comprises a main circulation fan and a secondary fan, wherein the fan which is coupled to the rotor is the secondary fan. The main circulation fan impels gas movement around the gas circulation pathway. The secondary fan is provided for the purpose of humidity measurement. The main circulation fan may direct gas through a gas circulation conduit. The secondary fan may be located in a secondary gas chamber. The secondary gas chamber may receive gas from the gas circulation conduit, or the chamber, and/or output gas to the gas circulation conduit and/or the chamber. Gas may be diverted from the main circulation pathway through the secondary gas chamber for humidity measurement using the secondary fan. This is especially useful where the flow resistance of the gas circulation pathway varies significantly with the amount of matter (e.g. food) present in the chamber (e.g. oven chamber). For the secondary fan, the majority of gas flow resistance is typically provided by the inlet into and outlet from the secondary gas chamber.

The apparatus may be configured to regulate the humidity within the oven responsive to the humidity measurement. For example, the humidity may be regulated towards a target humidity or to within a humidity range, which may vary during an operating program.

The apparatus may comprise an induction heater configured to evaporate water to controllably increase humidity within the oven. The induction heater may be switched on at the beginning of a cooking program to increase humidity (to increase mass transfer by convection) and is typically switched off when humidity exceeds a threshold and/or after a period of time. The induction heater may be provided on the base of the oven. It may heat water within a container introduced into the oven chamber in use.

The apparatus may comprise a controllable inlet through which ambient air may be selectively drawn into the apparatus to reduce humidity. The controllable inlet may be opened responsive to determining that the humidity exceeds a threshold or at a predetermined time or stage in a cooking program.

A second aspect of the invention provides a method of measuring the humidity of gas within an apparatus, the method comprising driving a fan, which is coupled to the rotor of an induction motor, by applying an AC current to the stator of the induction motor, determining the temperature of gas within the apparatus, determining the speed of rotation of the rotor and processing the temperature of the gas and the speed of rotation of the rotor to determine a measurement of the humidity of gas within the apparatus.

The method may comprise determining the temperature of at least one coil of the stator. Determining the measured humidity may comprise taking into account the determined temperature of the at least one coil of the stator. The speed of rotation of the fan may be determined by measuring the speed of rotation of the fan.

The determination of the measurement of humidity may take into account a calibration factor related to the elevation above sea level, resistance of the bearings of the rotor and/or fan (which may change over extended time periods) and mains supply voltage. The calibration factor may be determined at first installation of the oven and/or by an automatic procedure (typically under the control of the controller).

The method may comprise switching off one or more heating elements of the appliance while a humidity measurement is made.

It may be that the apparatus is configured so that slip varies by at least 0.001, or by at least 0.002, or at least 0.005, or at least 0.01 between humidity of 0% and 100%, at constant gas and coil temperature.

The humidity within the chamber may be controlled responsive to the humidity measurement. For example, the humidity may be regulated towards a target humidity or to within a humidity range, which may vary during an operating program.

The method may comprise switching on an induction heater (e.g. at the beginning of a cooking program) to increase humidity (to increase mass transfer by convection). The method may comprise selectively opening a controllable inlet (e.g. by operating a valve) to draw air into the apparatus to reduce humidity.

Features described above in relation to the first or second aspect of the invention are optional features of either the first or second aspect of the invention.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

An example embodiment of the invention will now be illustrated with reference to the following Figures in which.

DETAILED DESCRIPTION

Figure 1:
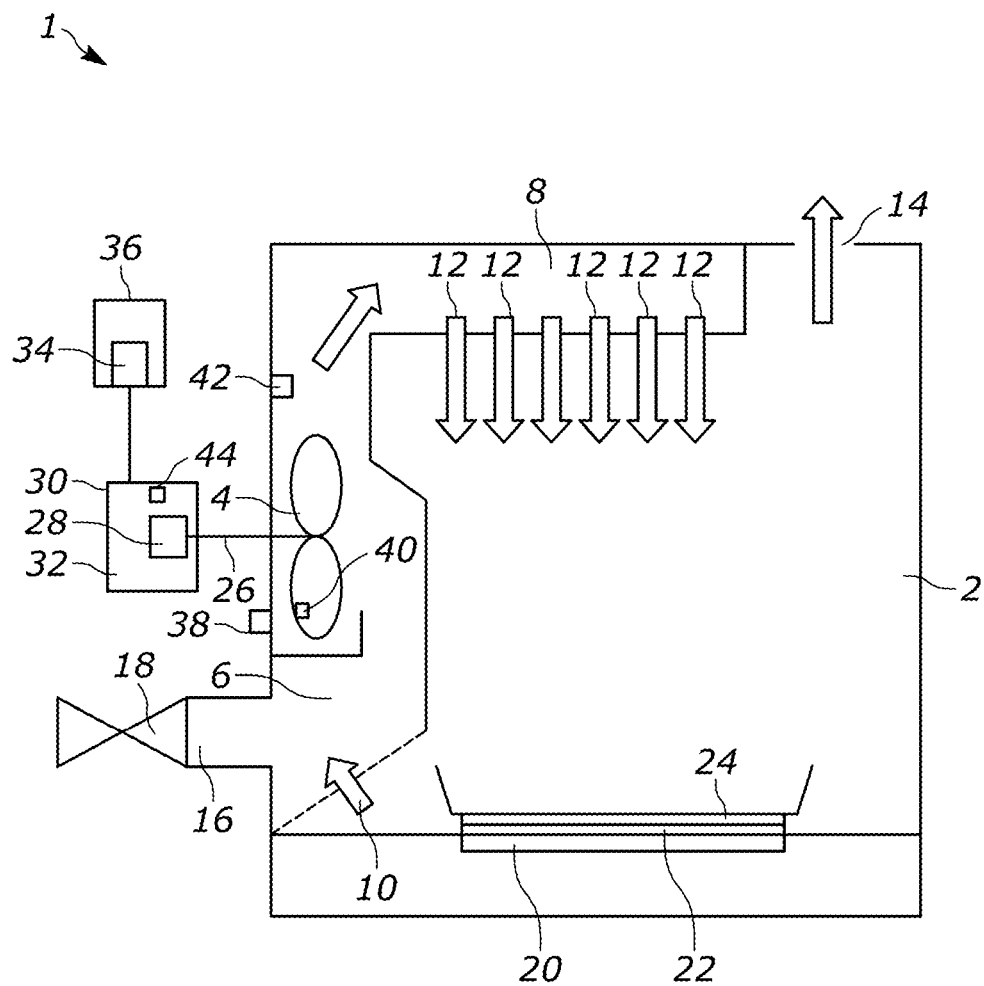
FIG. 1 is a schematic diagram of an oven according to the invention.

With reference to FIG. 1, an oven 1 according to the invention comprises an oven chamber 2, within which food is cooked in use. A gas circulation pathway is formed by a conduit having a gas receiving region 6 upstream of fan 4, and a gas output region 8 downstream of the fan. During cooking, gas circulates into the gas receiving region of the circulation pathway through a peripheral vent 10 (e.g. a removable gauze filter) around the base of the oven chamber, then through fan 4, which impels the gas, to the gas output region from where it passes through nozzles 12, into the oven chamber where it impinges on food at the base of the oven. Gas may pass out of the oven chamber through an outlet 14, which provides a route for humidity to leave the oven chamber. A controllable inlet 16, is regulated by an electronically controlled valve 18, and is selectively openable to allow ambient air into the oven chamber, which enables humidity to be reduced controllably. Oven gases become humid during operation due to water released by food during the cooking process. Electrical elements for cooking are included in the base of the oven and/or within the gas circulation pathway as are known in the art. There may be radiant heating elements in the roof of the oven. An induction heater 20 is provided to heat a base 22 on which a food container 24 rests, or the food container may itself be made out of material which is heatable by induction, for example formed of aluminum with a thin coating of stainless steel or another ferromagnetic material. The induction heating of food or water within the container provides another source of water vapor within the gas circulation pathway and some embodiments of the invention deliberately drive the induction heater to evaporate water in the early stages of cooking to build up to a desired humidity.

The blades of the fan 4 are connected through an axle 26 to the rotor 28 of a shaded pole induction motor 30. The stator 32 of the motor is driven in use with an AC current from a motor drive circuit 34 of an oven controller 36. A temperature sensor 42 measures the temperature of gas within the fan. A temperature sensor 44 measures the temperature of the stator coil of the motor. The oven controller contains a microprocessor in electronic communication with a microprocessor which stores program instructions and data and which controls the function of the oven responsive to data which is received from the various sensors.

The apparatus is configured so that the torque on the fan is relatively high in use. This arises from the flow impedance of the nozzles 12, and the position and shape of the fan and is discussed further below.

During operation, the fan is driven by an AC current (typically at the frequency of the power supply) applied to the stator coil of the motor. The temperature of circulating gas is measured by temperature sensor 42, the temperature of the stator coils are measured by temperature sensor 44, the speed of rotation of the fan (which is in this example the same as the speed of rotation of the rotor) is measured by fan rotation sensor 38.

As we have described above, the synchronous speed of a 2-pole AC induction motor in RPM is given by:

$$N_s = \frac{120 f}{2}$$

where f is the frequency in Hz. For f=50 Hz, Ns=3000 RPM. A typical value for the fan used in a domestic oven is s=0.09 so N=2730 RPM (45.5 Hz). As mentioned above, for this type of shaded pole motor, s varies with torque, and the relationship is close to linear. It is also known that:

torque=f(N, ρ, bearing friction) with the density, ρ, given by the ideal gas law:

$$\rho = \frac{M P_{atm}}{RT}$$

where M for a mixture of H vol % steam in air is given by:

$$M = \frac{(18H + 29(1 - H))}{100}$$

with R=8314 J/mol K and T the gas temperature in degrees Kelvin.

It follows that, for an oven permanently installed at a particular altitude above sea level a measurement of fan (and therefore rotor) speed, N, and gas temperature, T, can be used to derive a value for the humidity, H.

Bearing friction can be expected to change during the lifetime of the oven, and a method of compensating for this is incorporated into the measurement system.

Tests on fans used in domestic ovens show that the variation of slip with humidity is small over the range of operating conditions typically used (15° C.<T<230° C. and 0<H<100%). The gas circulation pathway and fan have thereby been selected so that the fan is operating at the highest practical value of torque and therefore slip, so that the changes in N are large enough to ensure sufficient resolution and accuracy in the derivation of a value for H.

A fan sensor in the form of a Hall effect sensor 38 measures the speed of rotation of the fan blades, periodically detecting a magnet 40 within a blade and thereby enabling the speed of rotation of the fan blades and so the rotor of the induction motor to be determined.

N can be measured conveniently and accurately using a low-cost tachometer. In this oven a small cylindrical neodymium magnet 40 is attached to the tip of one of the blades of the thrower (a small secondary impeller mounted outside the oven, used to cool the fan shaft and motor area). A solid-state non-contact Hall effect sensor 38 detects the magnet each revolution of the fan shaft and generates a low voltage DC square wave pulse train. These pulses are counted by the microprocessor to derive a frequency in Hz. Being a digital input, this measurement of N is not susceptible to analogue drift and loss of calibration.

T will be measured already by the oven control system, for control of heat input to the oven using temperature sensor 42. Alternatively, a dedicated temperature sensor may be used, in which case it could be incorporated in the gas circulation conduit, close to the fan. Any convenient temperature sensor is acceptable, including a thermocouple, a thermistor or a platinum resistance device. These are of course analogue devices, and therefore potentially susceptible to calibration drift. However practical experience with these devices informs us that the magnitude of the errors that might occur over the lifetime of an oven are small. Errors or drift greater than 10° C. are most unlikely.

Such an error would have a minimal effect on the accuracy of the humidity measurement method described here.

Figure 2A:
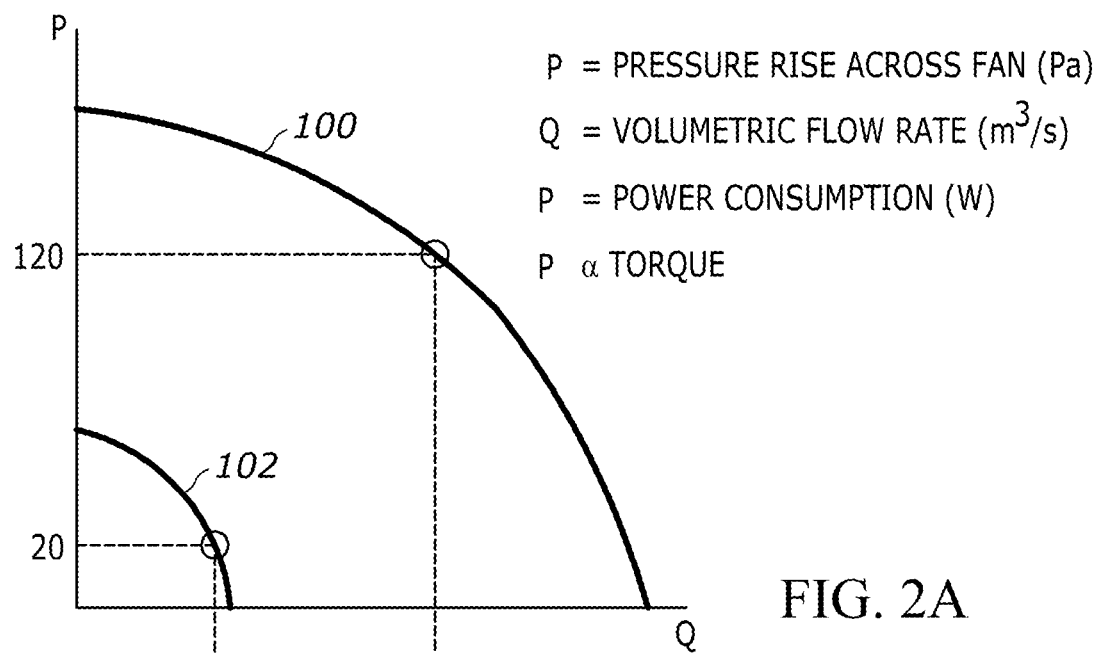
FIGS. 2A and 2B are graphs of the pressure rise (Pa) and power consumption (W) of a fan in an oven according to the invention and in a conventional oven, with volumetric flow rate (m3/s)
Figure 2B:
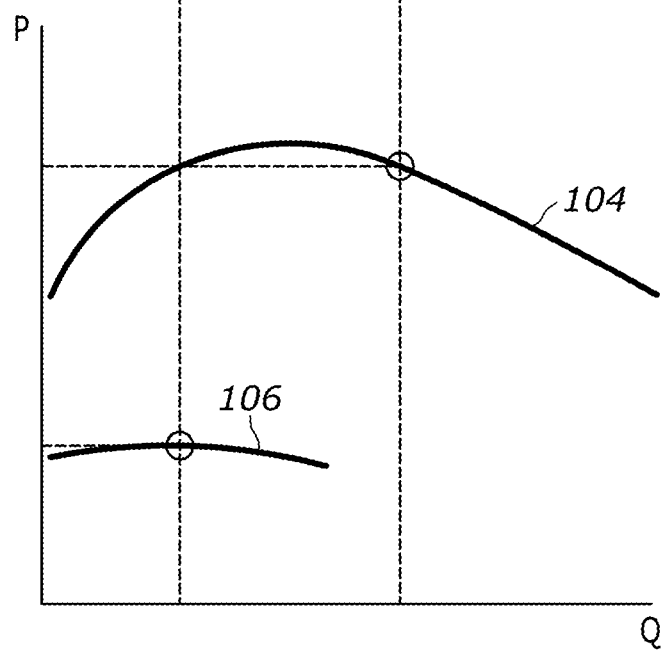

The characteristic performance of a centrifugal fan of the type used in domestic ovens, is shown in FIGS. 2A and 2B, where it is compared to the performance of a fan according to the present invention. FIG. 2A shows the pressure rise or difference across the fan, ΔP (Pa), as a function of the volumetric flow rate, Q (m³/s), for an oven according to the invention 100, operating at 45 Hz (with the stator driven by a 50 Hz AC supply) and a conventional oven 102 (with the fan operating at 15 Hz), and FIG. 2B shows how the power consumption of the fan, P, varies with the volumetric flow rate, Q, for an oven according to the invention 104, operating at up to 65 W, and a conventional oven 106, operating at up to 24 W. It is apparent that in a system corresponding to the present invention both the pressure difference across the fan and the power consumption of the fan are distinctly larger than for a conventional oven system. The power consumption of the fan is a function, typically linear, of the torque of the fan.

The air circulation system ensures much higher torque levels at the fan shaft than in conventional fan-assisted ovens, so that changes in N with humidity H are sufficiently large to be useful for humidity measurement.

Conventional ovens use low power circulation fans to improve the efficiency rating of the oven. However, running the air circulation fan at significantly higher speed and power draw can actually improve the oven efficiency, as long as the additional energy is used to direct impingement jets at the food surface. The improved convective heat transfer means that the oven can be operated at a lower temperature (e.g. 170° C. vs. 190° C. to roast a chicken) and hence heat losses through the walls of the oven are correspondingly lower—by an amount much larger than the additional fan power requirement.

It is typical for a domestic oven to be put through a heating cycle when first installed, to remove any residual oils or greases from the manufacturing processes. During this heating cycle the oven firmware will measure and store in the memory the variation of N with T and with motor stator temperature. The effect of altitude above sea level and local mains AC supply frequency and voltage is thus accounted for.

Figure 3:
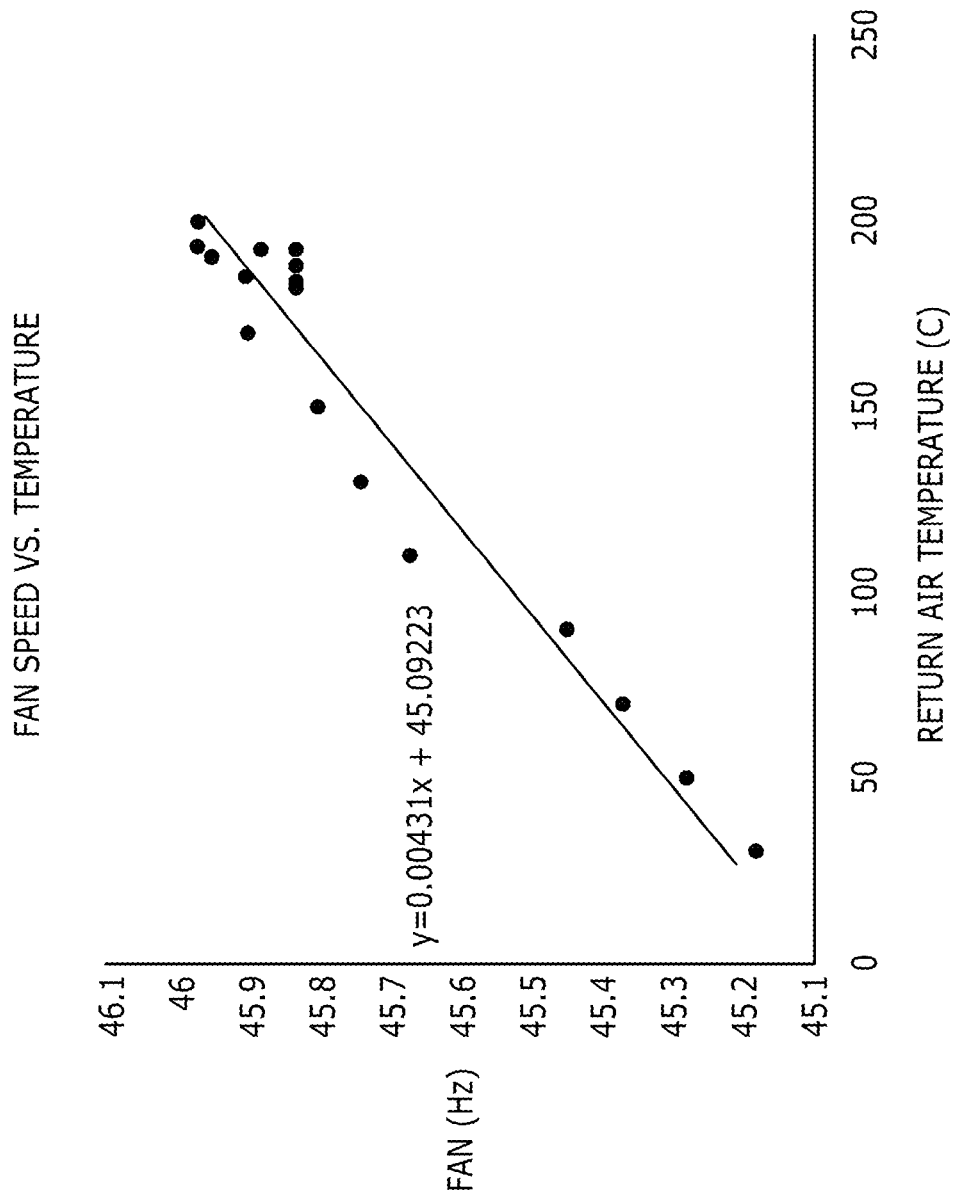
FIG. 3 is a graph of fan speed (Hz) versus gas temperature in an experiment using a shaded pole induction motor to drive the fan.

FIG. 3 shows experimental values for the speed of rotation of the fan (in Hz) as the oven temperature is increased from ambient, room temperature, to 200° C. Also shown in FIG. 3 is a linear fit to the experimental values. Data of this sort allows the effect of the oven temperature on the rotational speed of the fan to be used to create a look up table or parameters of a calibration equation, stored in the memory of the controller to be taken into account when using the rotational speed of the fan in a calculation of humidity. This calibration can be repeated periodically (perhaps every 6 months) by prompting the user to initiate an automatic heating cycle. This then accounts for any changes in bearing friction over the lifetime of the oven. Improved accuracy can be achieved if a 2nd order polynomial fit is used, rather than a linear fit.

In this calibration method, the fan is first run for about 30 minutes at ambient temperature to characterize the effect of motor stator temperature on fan speed. The oven is then heated to, say, 220° C. to characterize the effect of the gas temperature on motor speed.

The influence of humidity H on fan speed N (at a certain gas temperature, T) can be determined empirically using a reference humidity sensing device at the place of manufacture and again is used to derive calibration data stored in a look up table or as parameters of a fitted curve. This relationship is fundamental, due only to the change of gas density with steam content and will not change during the lifetime of the oven.

Figure 4:
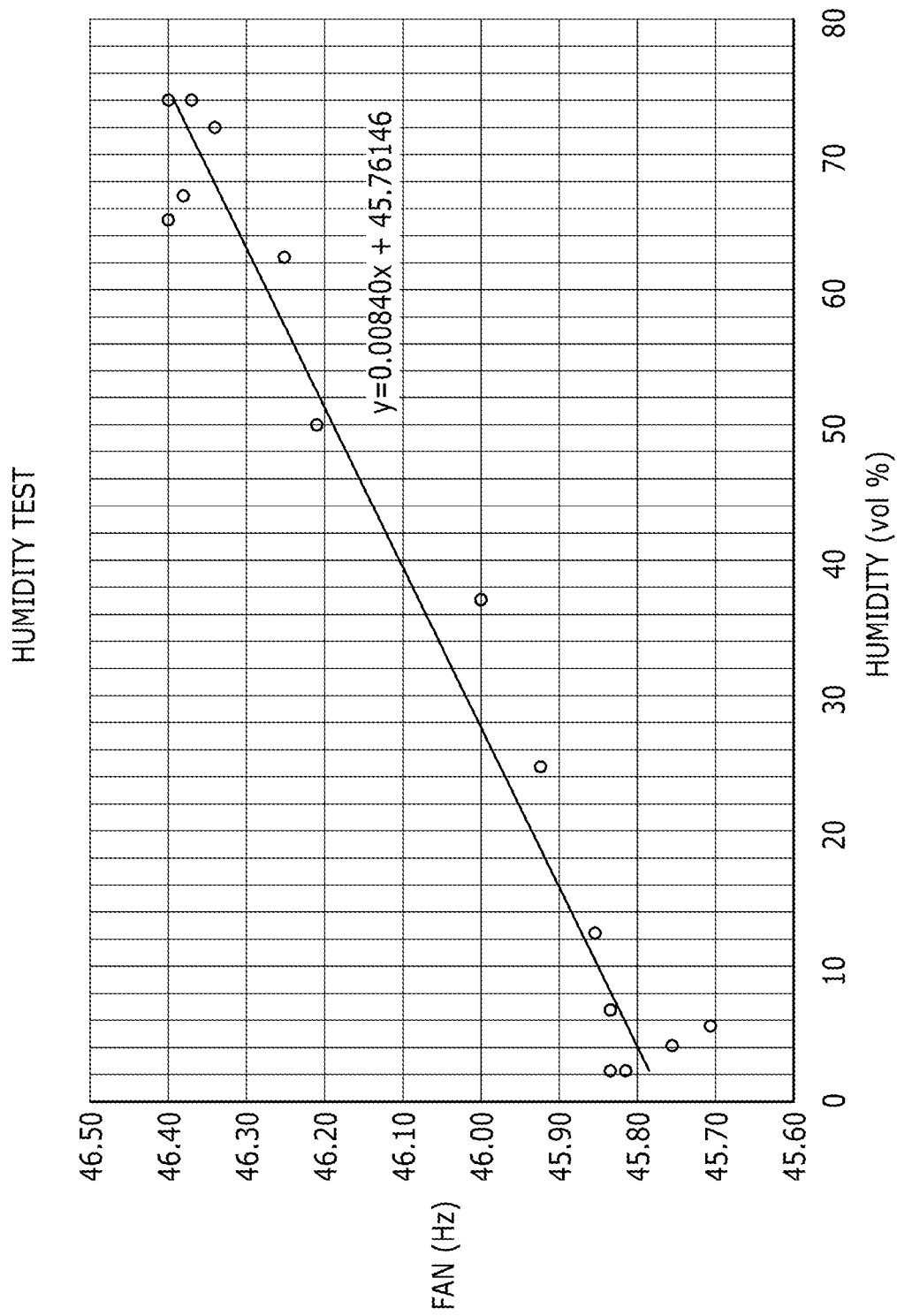
FIG. 4 is a graph of fan speed (Hz) versus humidity (vol %) in an experiment.

FIG. 4 shows a graph of experimental data of the rotational speed of the fan (in Hz) as a function of humidity (in vol %) at 190° C. A linear fit to the data is also shown.

The slope of this linear fit (c=0.00840 in this example) can be assumed to be unaffected by temperature. Alternatively, for improved accuracy the variation of the fan speed can additionally be determined as a function of temperature and this function stored in memory.

The performance characteristic of a shaded pole motor driving an oven fan is also dependent on the temperature of the motor itself. Due to the relatively low efficiency of this type of motor (typically 25%), significant heat is generated in the motor body, causing a temperature rise in the motor itself to perhaps 50° C. above ambient. This happens in about 30 minutes from a cold start.

Figure 5:
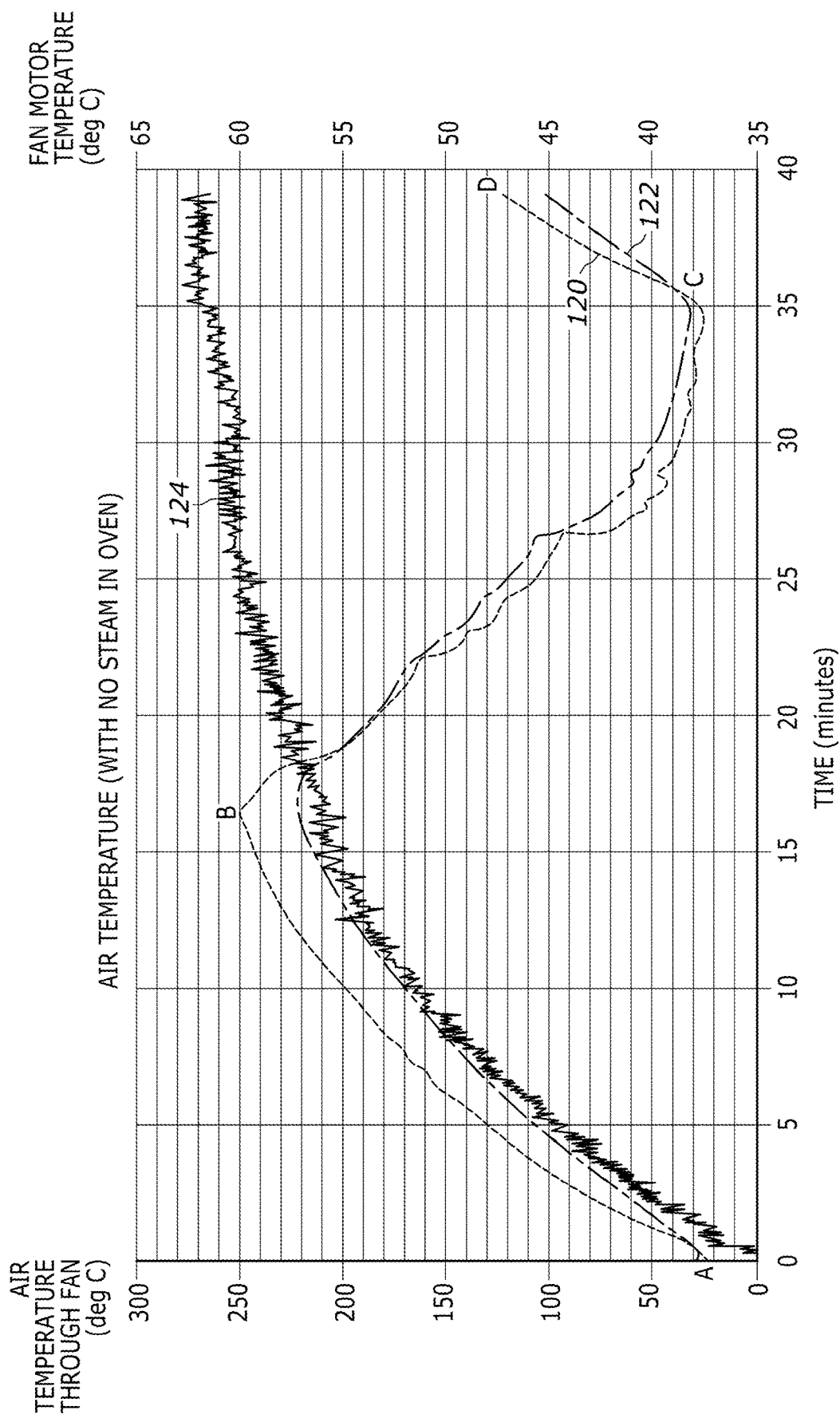
FIG. 5 is a graph of air temperature (left hand y-axis) at the fan inlet and output, and stator coil temperature (right hand y-axis) versus time, during a cooking cycle of an oven.

FIG. 5 shows temperature measurements taken from a domestic built-in oven heated from ambient (point (A)) to 230° C. in 17 minutes (point (B)), then cooled down again to close to ambient (point (C)), then reheated to 100° C. (point (D)). The air circulation fan inlet 120 and outlet 122 temperatures are plotted, as well as the temperature of the fan motor body 124. The fan motor body temperature was measured using a thermocouple in the stationary layered magnet. During this temperature cycle, which lasts around 40 minutes, the motor body increases in temperature from 20° C. to 62° C.

Figure 6:
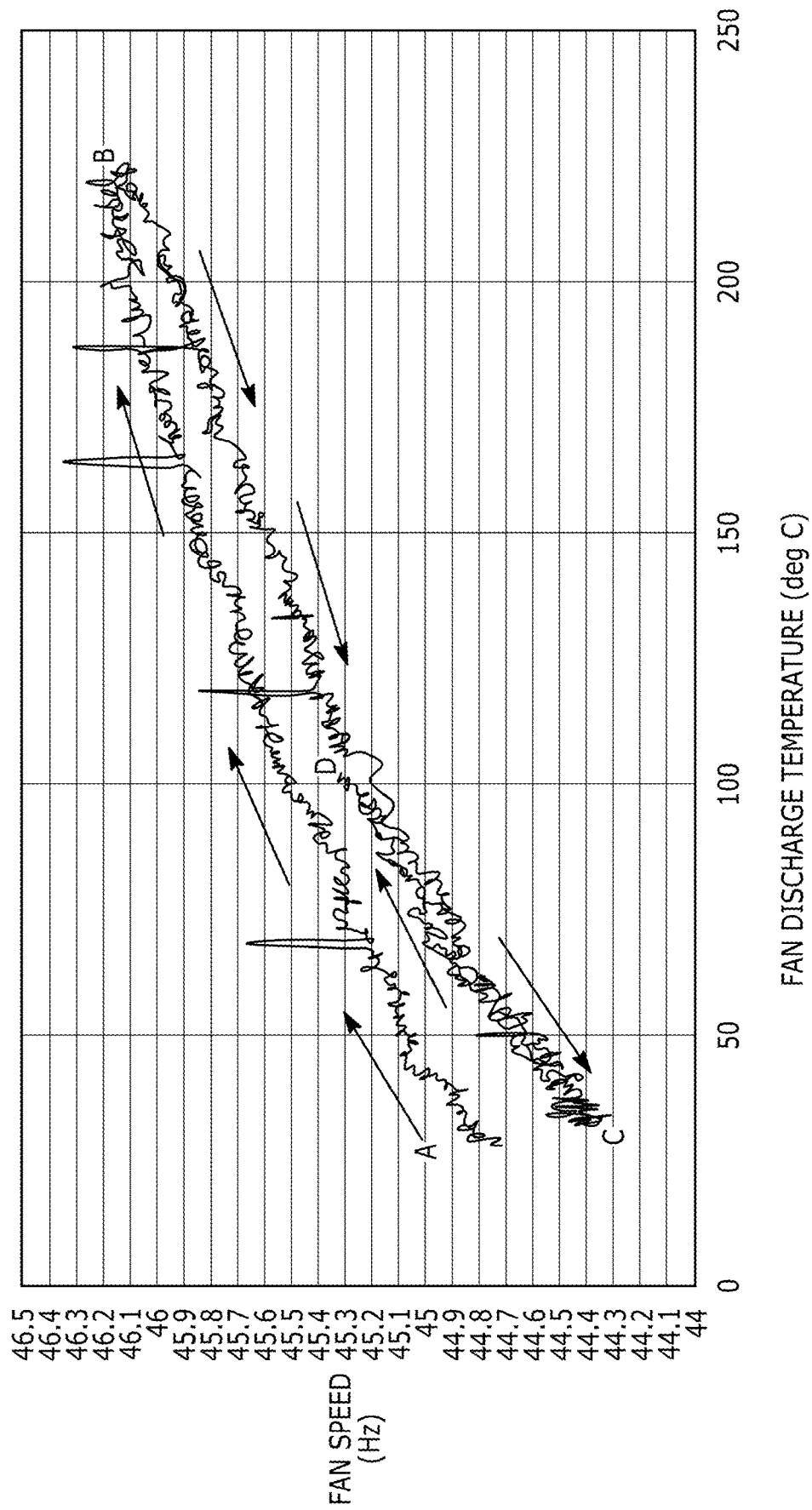
FIG. 6 is a graph of fan speed (expressed as rotation frequency in Hz, y-axis) versus fan discharge temperature (x-axis), with time during a cooking cycle of an oven.

The effect of the motor body temperature on fan rotational speed is significant, as shown in FIG. 6 (here the arrows indicate the increase and subsequent decrease of fan speed as experimentally recorded). At a fan discharge temperature of 35° C. fan speed is 44.90 Hz for a motor at 25° C., and 44.40 Hz for a motor at 62° C. This is a difference of 0.50 Hz for a motor heating up from 25° C. to 62° C. This is a 30% error in speed reading, since the total speed range is (46.10-44.40)=1.7 Hz. The error that is introduced into the calculation of humidity from the fan speed using compensation for air temperature only (as described earlier) is even larger—up to 70%.

In summary, we found in an experiment that:
  the effect of gas temperature is an increase of approximately 0.8 Hz in 45 Hz for a range ambient to 250° C.;
  the effect of humidity is an increase of approximately 0.6 Hz in 45 Hz, for a range of 0 to 100% vol H2O;
  the effect of motor temperature is a decrease of approximately 0.5 Hz in 45 Hz for a range of 20 to 65° C. (In some embodiments, the motor may be even hotter, for example it may reach 90° C. giving a larger effect).

Without the correction for motor temperature, the signal due to humidity variation would be highly inaccurate. This could only otherwise have been avoided by running the fan with very low torque and so minimal variation in motor temperature, but in this case the variation in slip with humidity would be very small, again leading to an inaccurate measurement.

Figure 7:
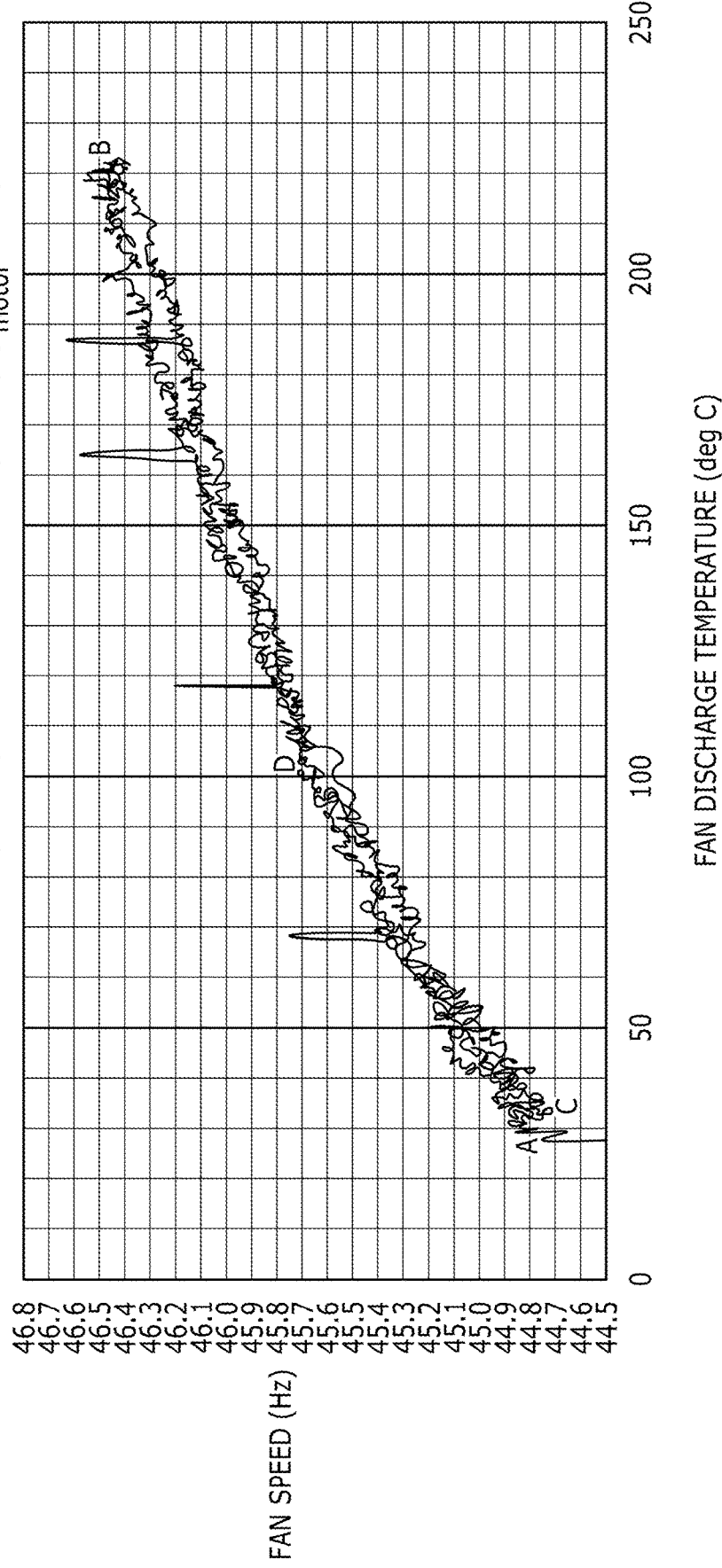
FIG. 7 corresponds to FIG. 6 but with correction for the measured temperature of the stator coil.
Figure 8:
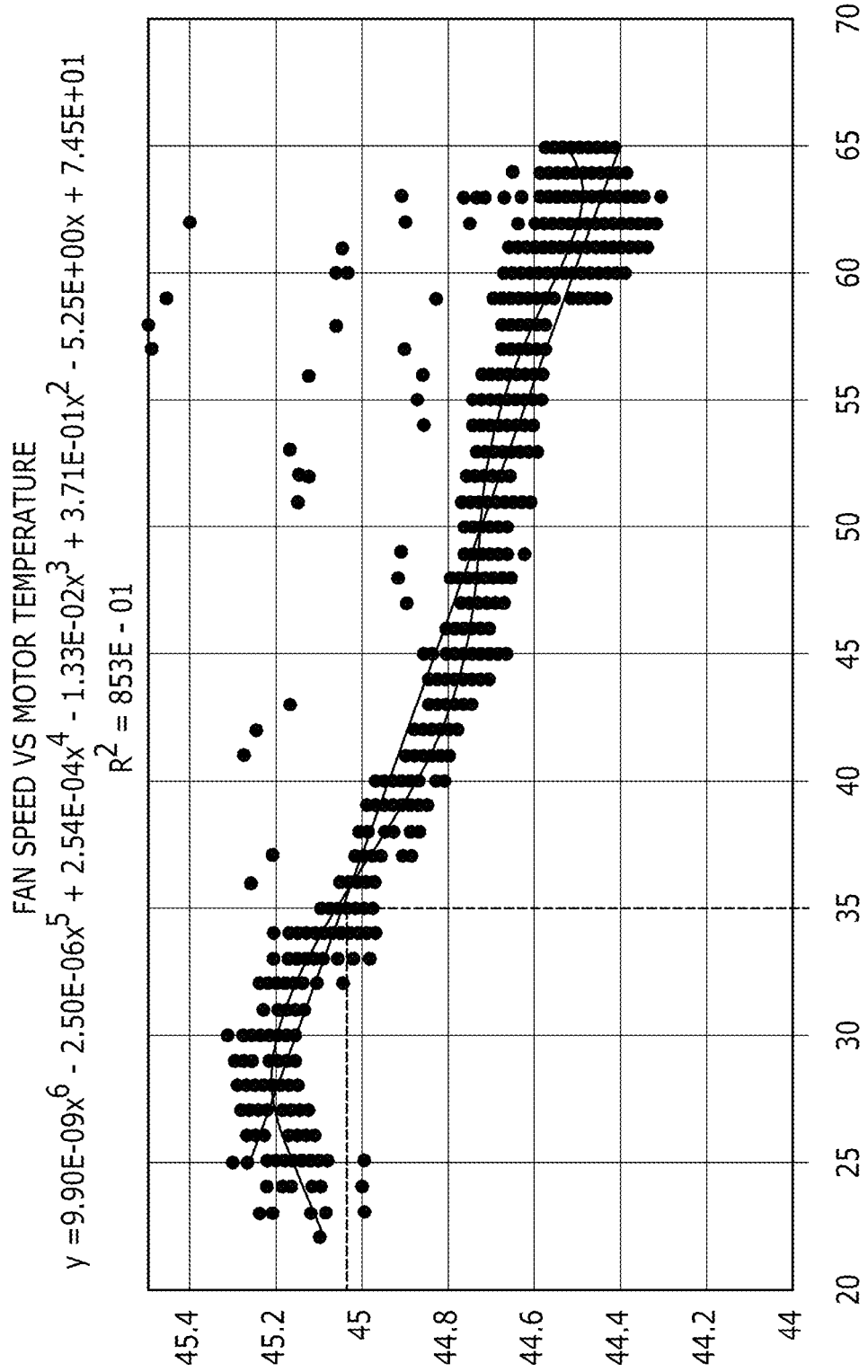
FIG. 8 is a graph of fan speed (y-axis) with coil temperature (x-axis) with oven gas of constant humidity and temperature.

However, according to the invention, the temperature of the coil of the motor is measured and this is used to correct the speed reading before the humidity calculation, using a calibration curve stored in memory, for example a smoothed version of the experimental data shown in FIG. 7, or FIG. 8 which shows the variation in fan speed with coil temperature with gas of constant humidity and temperature.

In more detail, humidity is calculated during cooking as follows:
  At every time interval, t, (typically 1 second) the fan speed N (Hz) and air temperature at the fan, T (° C.), are measured.
  If N $(t_n)$−N $(t_{n+1})$>0.1 Hz, then N$(t_{n+1})$=N $(t_n)$.

The controller applies a digital filter to ignore 'spikes' due to electrical noise, interference in the tachometer pulse train, and/or pulse counting errors. The basis of the filter is that the inertia of the fan impeller is too high to allow changes in speed of greater than 0.1 Hz in 1 second. This type of filter may need to be extended to 3 or 4 seconds depending on the noise level in the incoming signal.

$N_{130° \, C.}$ is calculated using the slope of the temperature calibration data:

$$N_{130° \, C.} = N - a(T-130)$$

The fan coil temperature $T_m$ (° C.) is compensated for:

$$N_{130° \, C.} = N_{130° \, C.} + e^{(T_m - f)}$$

This value is smoothed, for example by calculating a moving average over 10 seconds.

$$H = \frac{N_{130° \, C.} - N_{air, 130° \, C.}}{c}$$

Humidity is calculated using the factory calibration data:

$$H = 5\left(\ln t \frac{H}{5}\right)$$

The resolution is reduced to 5% intervals, to give steady progression of displayed values.

Figure 9:
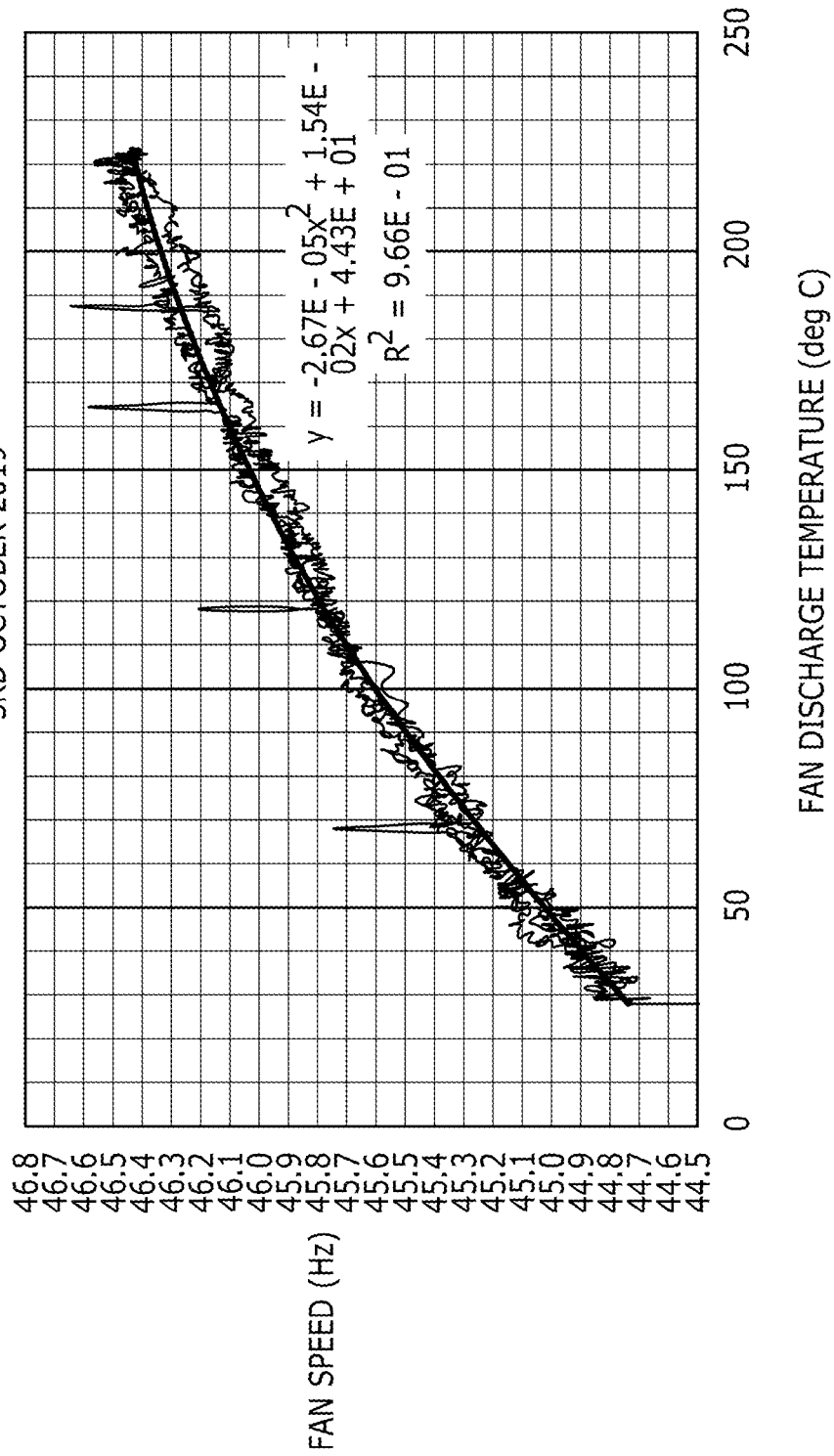
FIG. 9 is a graph of fan speed (Hz) (y-axis) versus fan discharge temperature (° C.) (x-axis), at constant humidity, in an example according to the invention.

FIG. 9 shows the results of correction for coil temperature, according to the invention, on the measurement of air at constant humidity across a range of fan discharge temperatures during an experiment.

Figure 10:
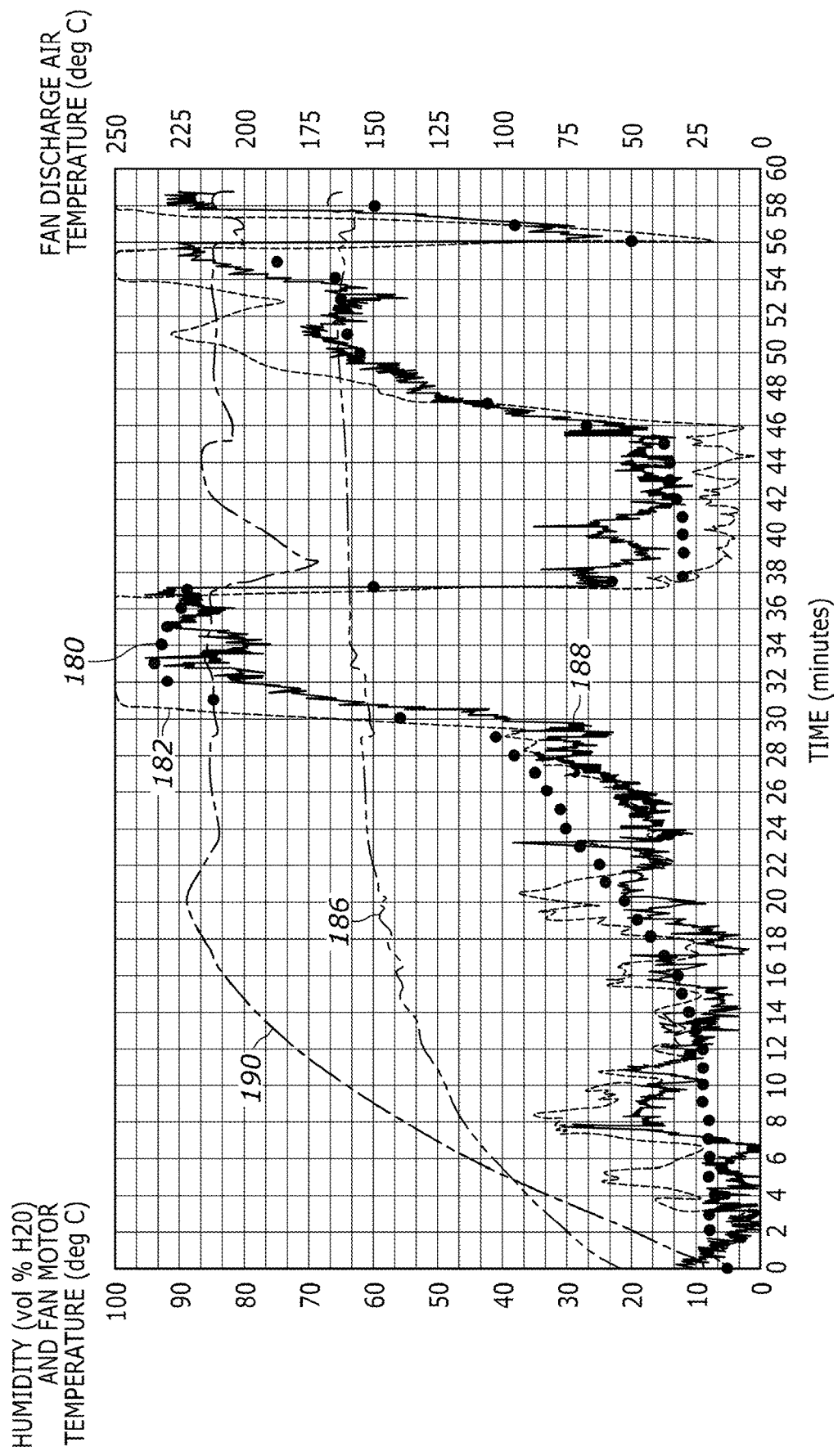
FIG. 10 is an experimental verification showing independently measured humidity (H ref), calculated oven humidity (H) without correction for coil temperature, and with correction for coil temperature using a linear fit and a polynomial fit, measured fan motor speed, measured gas temperature at the fan inlet and fan motor power, with time during a cooking cycle.

FIG. 10 is an experimental verification showing independently measured humidity 180, calculated oven humidity without 182 correction for coil temperature, and with 188 correction for coil temperature using a polynomial fit, measured fan motor speed 186, and measured gas temperature at the fan inlet 190, with time during a cooking cycle. A correction for coil temperature using a linear fit (not shown, for clarity) was also carried out. It can be seen that the coil temperature correction and the relatively high variation in slip with humidity enables an accurate humidity measurement, especially with the polynomial fit for slip correction with coil temperature.

Figure 11:
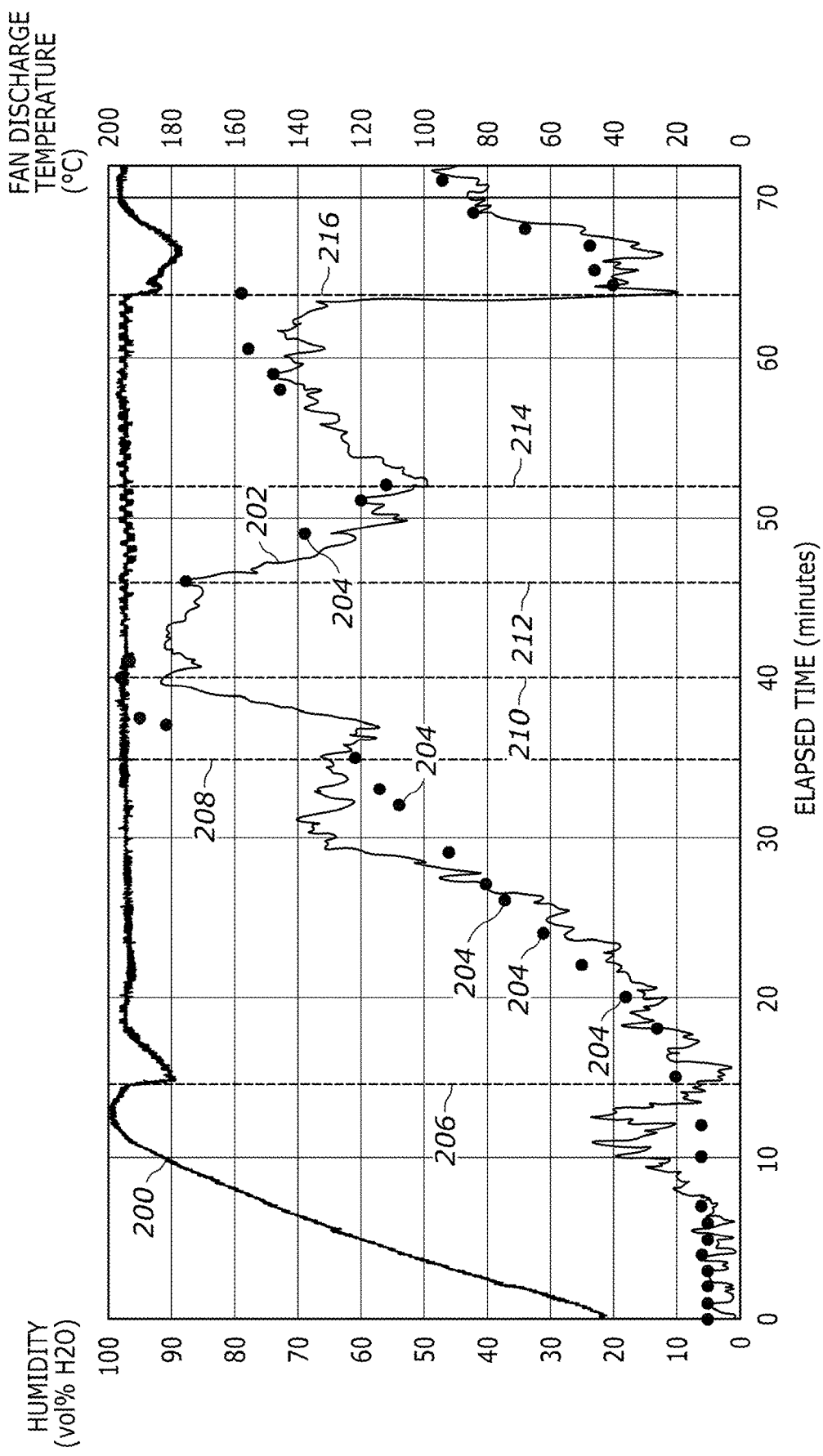
FIG. 11 shows the variation in air temperature at the fan discharge 200, gas humidity measured according to the invention 202 and by a reference humidity sensor 204, during an experimental validation.

FIG. 11 is a further experimental verification showing variation in fan discharge temperature 200 and gas humidity 202 determined according to the invention with humidity measurements from a reference humidity sensor 204, with time, during a heating cycle, in which a dish of water is placed on a hotplate with a ceramic cover at time 206, the induction hotplate is switched on at time 208 and off at 210, the valve is opened to introduce atmospheric air and reduce humidity at time 212 and closed again at time 214. The oven door is opened at time 216.

This humidity sensing arrangement should typically remain reliable for the entire lifespan of the apparatus (>10 years).

The reliable humidity sensing enables humidity to be better controlled. In order to achieve effective humidity control in a domestic oven, the pressure distribution must be carefully configured. The main enclosure must operate at close to 0 Pa(g)—i.e. the same atmospheric pressure as the room in which it is installed. This is important to minimize leakage of hot gases out of the oven, and possible condensation of steam within the oven insulation and on electrical components located outside the insulation. In order to minimize manufacturing costs, domestic ovens are typically not completely air tight. However, embodiments of the present invention are configured to allow ambient air to be drawn into the oven through valve 18 and inlet 16 to controllably reduce humidity.

Figure 12A:
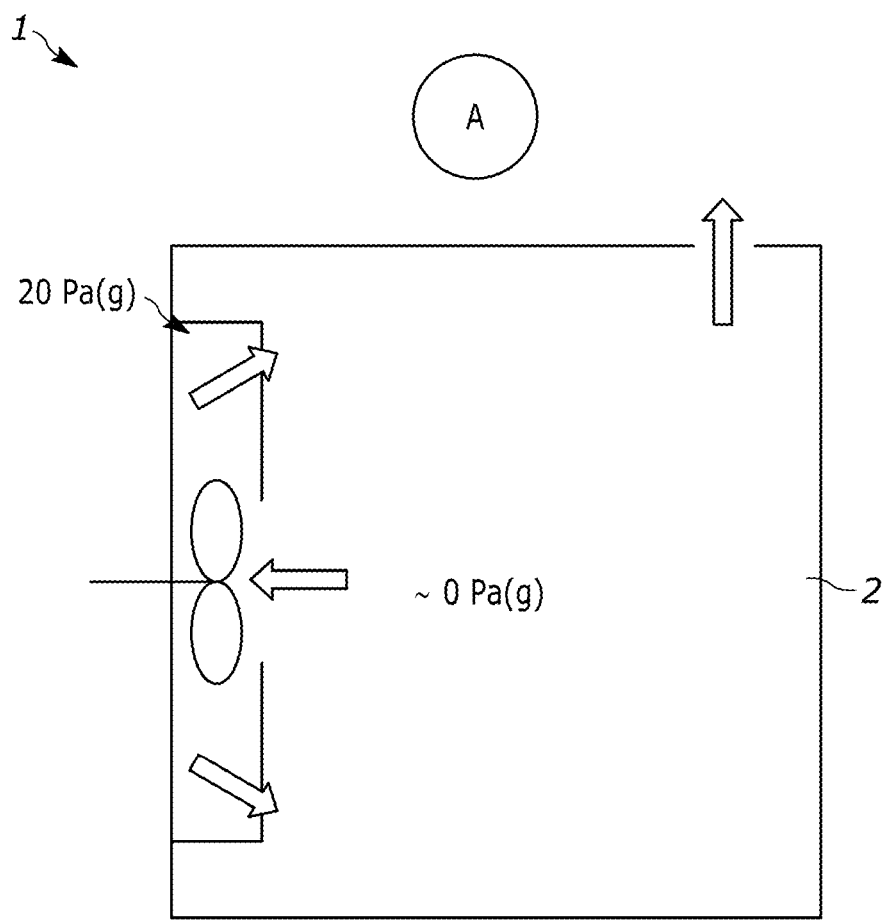
FIGS. 12A, 12B and 12C show pressure variation within ovens having different gas recirculation configurations (FIG. 12C is an embodiment according to FIG. 1)
Figure 12B:
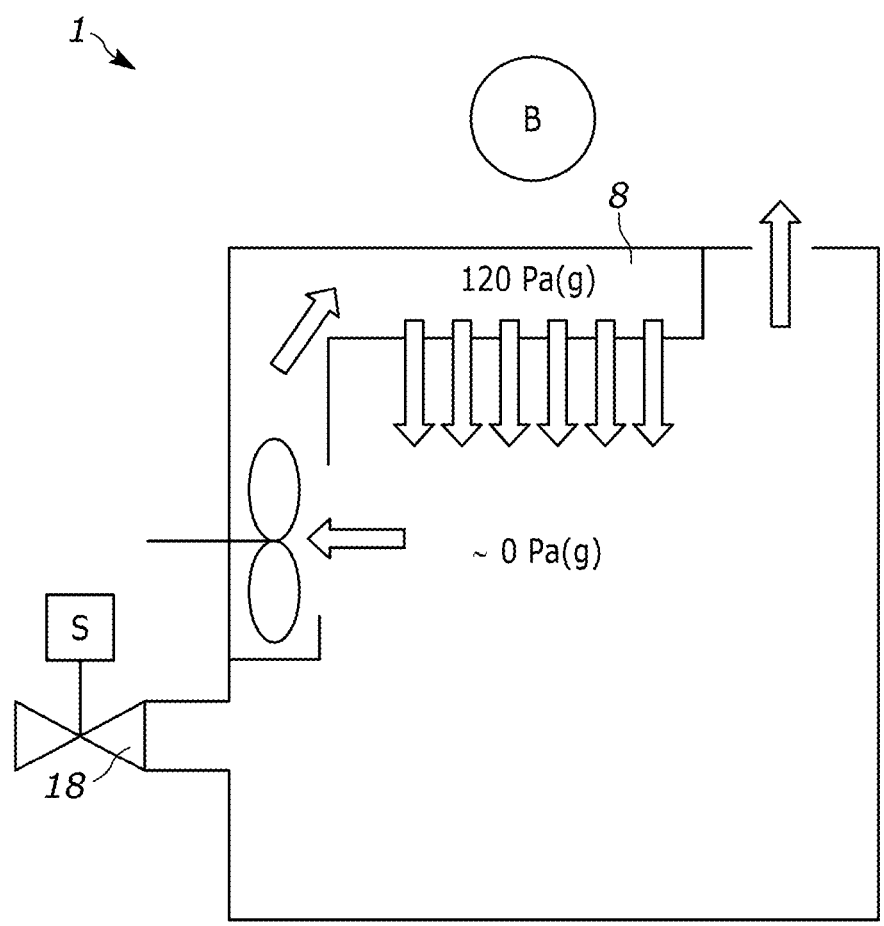
Figure 12C:
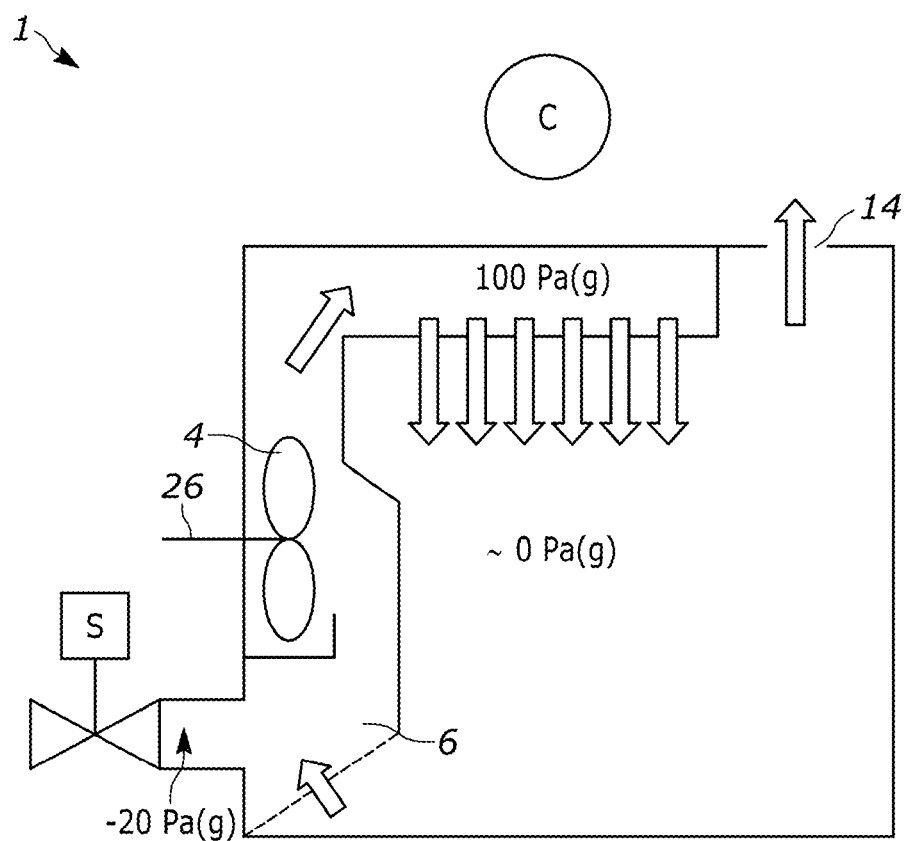

FIGS. 12A through 12C show the pressure of gas at various locations in ovens of different configurations. In the arrangement of FIG. 12A, typical of conventional domestic ovens, there is no controllable fresh air inlet or impingement jets. It is therefore not possible to reduce the humidity in the oven by diluting the oven atmosphere with fresh air. In the arrangement of FIG. 12B there is insufficient pressure difference across the fresh air inlet valve to draw in air, if required to reduce the humidity in the oven. In the arrangement of FIG. 12C, corresponding generally to FIG. 1, some of the impingement jet velocity (and hence improvement in convective heat transfer) has been sacrificed to create a negative gauge pressure at the fresh air inlet. A removable filter mesh is a convenient way to create this effect, since it is required anyway to prevent oil/fat mist droplets entering the recirculation system. Blockage of the inlet filter can be detected conveniently, since the value of N moves outside the normal operating range. Absence of the inlet filter can be detected using a microswitch.

Water vapor is evaporated from food during use. The oven of FIG. 1 incorporates an induction heating system in the base of the oven which can be used to boil water in a suitable dish or container, which will rapidly generate steam, to build humidity up to a desired value. This is often necessary only at the start of a cooking process. The oven of FIG. 1 has a vent 14 through which humidity may be lost to the atmosphere. Other embodiments have a sealed oven chamber to ensure that steam generated by evaporation from the food can be retained if required, meaning no additional steam generation system is necessary. In this way very high levels of humidity can be achieved (>90% vol $H_2O$).

Figure 13:
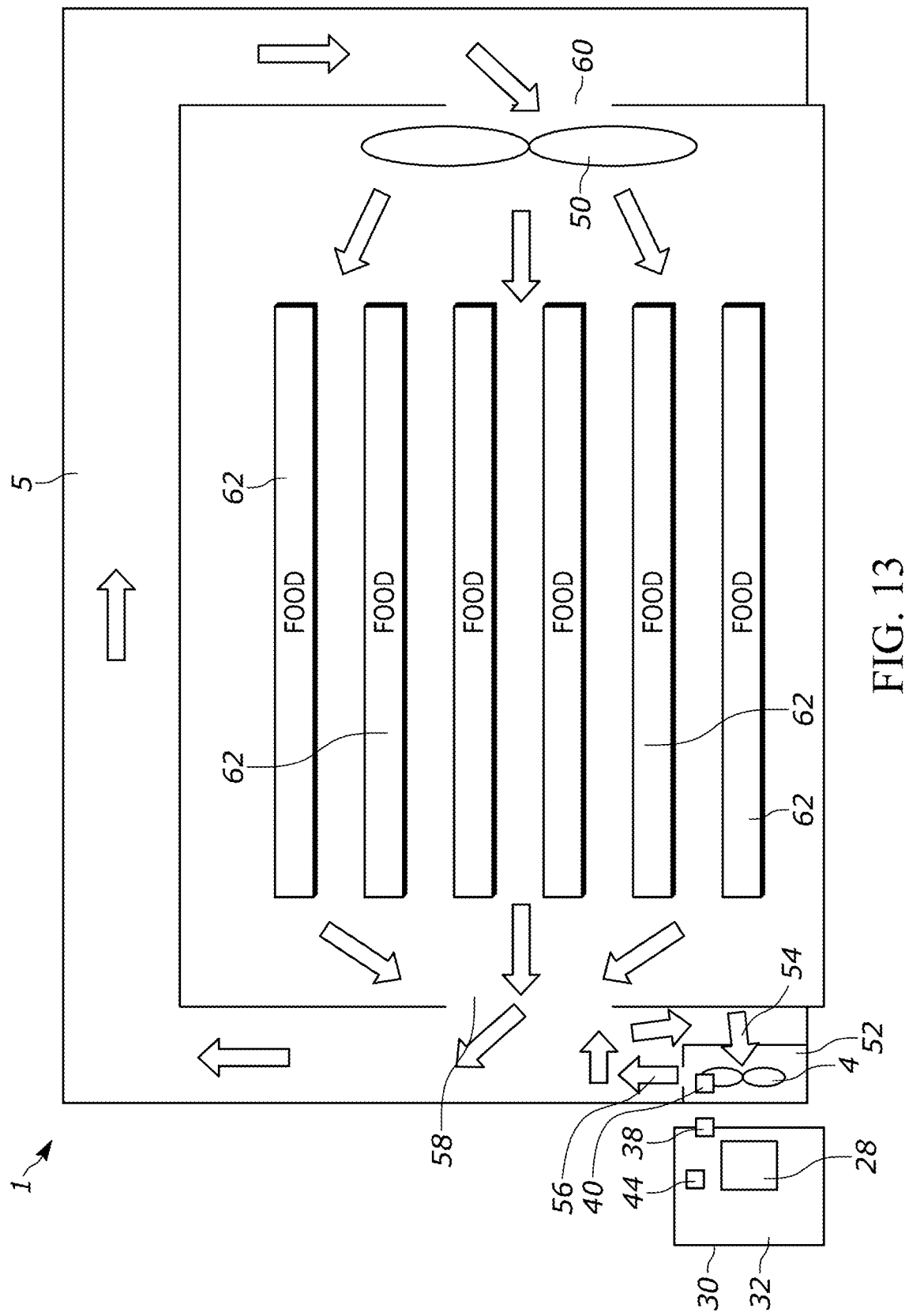
FIG. 13 is a schematic diagram of an oven according to a further embodiment of the invention with a secondary fan for humidity measurement. The behavior of this secondary fan is unaffected by the quantity of food loaded into the oven, whereas the main circulation fan is affected by the loading, to an extent that makes it impossible to measure humidity using this fan.

Some ovens may not be able to use this method, if the shape and/or quantity of food in the oven has a significant impact on the total pressure drop in the recirculation path. This occurs since changes in the total pressure rise across the fan (due to the food) will affect the fan speed, as well as temperature and humidity. In these cases, an additional fan, dedicated to the measurement of humidity, can be installed anywhere in the circulation path. The fan impeller is enclosed in such a way as to create a significant pressure rise from inlet to outlet. It may be convenient to position this fan in the duct work, away from the food cooking chamber, and shielded from direct impact by recirculating air. The fan and its tachometer are very low cost and so this is a commercially viable solution. An example is shown in FIG. 13 where the fan 4 used to measure humidity is located in a chamber 52, in communication with gas circulation conduit 5, through inlet and outlet apertures 54 and 56. The gas circulation conduit 5 extends from an inlet 58 to an outlet 60 past a conventional fan assisted oven fan 50, which functions as the main circulation fan, while the fan used for the humidity measurement is a secondary fan. Thus, although the flow resistance of the gas circulation pathway is dictated by the (highly variable) configuration of food 62 within the oven, the secondary fan is useful for providing a humidity measurement throughout the lifetime of the oven, without maintenance.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An oven comprising:
    a fan;
    an induction motor comprising a stator and a rotor, the rotor coupled to the fan to rotate with the fan;
    an electrical circuit configured to apply an alternating current (AC) current to a coil of the stator;
    a temperature sensor configured to determine a temperature of gas within the oven;
    a second temperature sensor configured to determine a temperature of at least one coil of the stator;
    a speed sensor configured to determine a speed of rotation of the fan and thereby the rotor;
    a processing circuit configured to process the determined temperature of the gas, the determined temperature of the at least one coil of the stator, and the determined speed of rotation of the rotor to thereby determine a measurement of a humidity of the gas within the oven; and
    an induction heater configured to evaporate water to controllably increase humidity within the oven responsive to the determined measurement of the humidity.

2. The oven according to claim 1, wherein the processing circuit is configured to process the speed of rotation of the rotor to determine a slip, wherein the slip is a difference between the speed of rotation of the rotor and a synchronous speed of rotation of the rotor, wherein the humidity of the gas is determined using the determined slip, wherein the synchronous speed of rotation of the rotor is the speed at which a magnetic field of the stator rotates due to the AC current.

3. The oven according to claim 2, wherein the processing circuit further determines the measurement of humidity by computing a moving average from previous humidity measurements determined during a predefined previous time period.

4. The oven according to claim 2, wherein the fan is configured to exert a torque such that the slip varies by at least 0.001 between the humidity of 0% and the humidity of 100% at a constant gas and stator coil temperature.

5. The oven according to claim 1, wherein the speed of rotation of the rotor is identical to the speed of rotation of the fan.

6. The oven according to claim 1, wherein the speed of rotation of the fan is determined by a fan speed sensor selected from the group consisting of a Hall effect sensor and an optical sensor.

7. The oven according to claim 1, wherein the determination of the measurement of humidity includes a calibration factor related to an elevation above sea level, a resistance of bearings of the rotor or fan, and a mains supply voltage, wherein the calibration factor is determined at first installation of the oven or periodically using an automated procedure.

8. The oven according to claim 1, further comprising a heating chamber and a gas flow circulation pathway extending from the heating chamber, through a gas conduit, past the fan, and back to the heating chamber.

9. The oven according to claim 8, wherein the heating chamber comprises one or more nozzles that direct gas that has been impelled by the fan to impinge on food within the oven.

10. The oven according to claim 1, further comprising a main circulation fan and a secondary fan, wherein the fan that is coupled to the rotor is the secondary fan.

11. The oven according to claim 10, further comprising a heating chamber and a duct including an inlet aperture and an outlet aperture, wherein the inlet aperture is configured to receive air from the heating chamber, wherein the fan is located in the duct.

12. The oven according to claim 1, wherein the induction heater is positioned at a base of the oven.

13. The oven according to claim 1, further comprising a heating element configured to heat the gas within a heating chamber of the oven.

14. The oven according to claim 1, wherein the processing circuit further determines the measurement of humidity by correcting the determined speed of rotation of the rotor using a linear calibration curve with the determined temperature of the at least one coil of the stator.

15. The oven according to claim 1, wherein the processing circuit further determines the measurement of humidity using a polynomial calibration curve with the determined temperature of the at least one coil of the stator.

16. The oven according to claim 1, wherein the temperature sensor is configured to determine the temperature of the gas at the fan.

17. The oven according to claim 1, wherein the processing circuit further determines the measurement of the humidity using a digital filter to set the determined measurement of the humidity to a previous value of the determined measurement of the humidity when a difference between the determined measurement of the humidity and the previous value of the determined measurement of the humidity exceeds a predefined threshold.

18. The oven according to claim 1, wherein the processing circuit is further configured to switch the induction heater off when the determined measurement of the humidity reaches a predefined humidity value.

19. A method of measuring humidity of gas within an oven, the method comprising:
  driving a fan, which is coupled to a rotor of an induction motor, by applying an alternating current (AC) current to a stator of the induction motor;
  determining a temperature of gas within the oven using a first temperature sensor;
  determining a temperature of at least one coil of the stator using a second temperature sensor;
  determining a speed of rotation of the rotor;
  processing the determined temperature of the gas, the determined temperature of the at least one coil of the stator, and the speed of rotation of the rotor to determine a measurement of a humidity of gas within the oven; and
  controllably increasing the humidity within the oven responsive to the determined measurement of the humidity using an induction heater configured to evaporate water.

* * * * *